Jan. 7, 1941. F. S. SMITH Re. 21,686

APPARATUS FOR DRYING

Original Filed Aug. 2, 1935 2 Sheets-Sheet 1

INVENTOR
Franklin S. Smith
BY
Blair, Curtis & Dunne
ATTORNEYS

Jan. 7, 1941. F. S. SMITH Re. 21,686

APPARATUS FOR DRYING

Original Filed Aug. 2, 1935 2 Sheets-Sheet 2

INVENTOR
Franklin S. Smith
BY
Blair, Curtis & Dunne
ATTORNEYS

Reissued Jan. 7, 1941

Re. 21,686

UNITED STATES PATENT OFFICE 21,686

APPARATUS FOR DRYING

Franklin S. Smith, Bethany, Conn., assignor, by mesne assignments, to F. J. Stokes Machine Company, Philadelphia, Pa., a corporation of Pennsylvania Original No. 2,127,474, dated August 16, 1938, Serial No. 34,313, August 2, 1935. Application for reissue August 3, 1940, Serial No. 351,078

8 Claims. (Cl. 34—30)

This invention relates to apparatus for drying.

One of the objects of this invention is to provide an apparatus for vacuum drying which is simple and practical in construction and efficient and reliable in operation. Another object is to provide apparatus of the above nature which can be inexpensively manufactured and readily assembled. Another object is to provide apparatus of the above nature which operates with maximum efficiency in an inexpensive and simple manner. Another object is to provide apparatus of the above nature which is thoroughly dependable and amenable to a great variety of uses. Other objects will be in part apparent and in part pointed out hereinafter.

The invention accordingly consists in the features of construction, combinations of elements, arrangements of parts, and in the relation and order of each of the same to one or more of the others, all as will be illustratively described herein, and the scope of the application of which will be indicated in the following claims.

Figure 1:
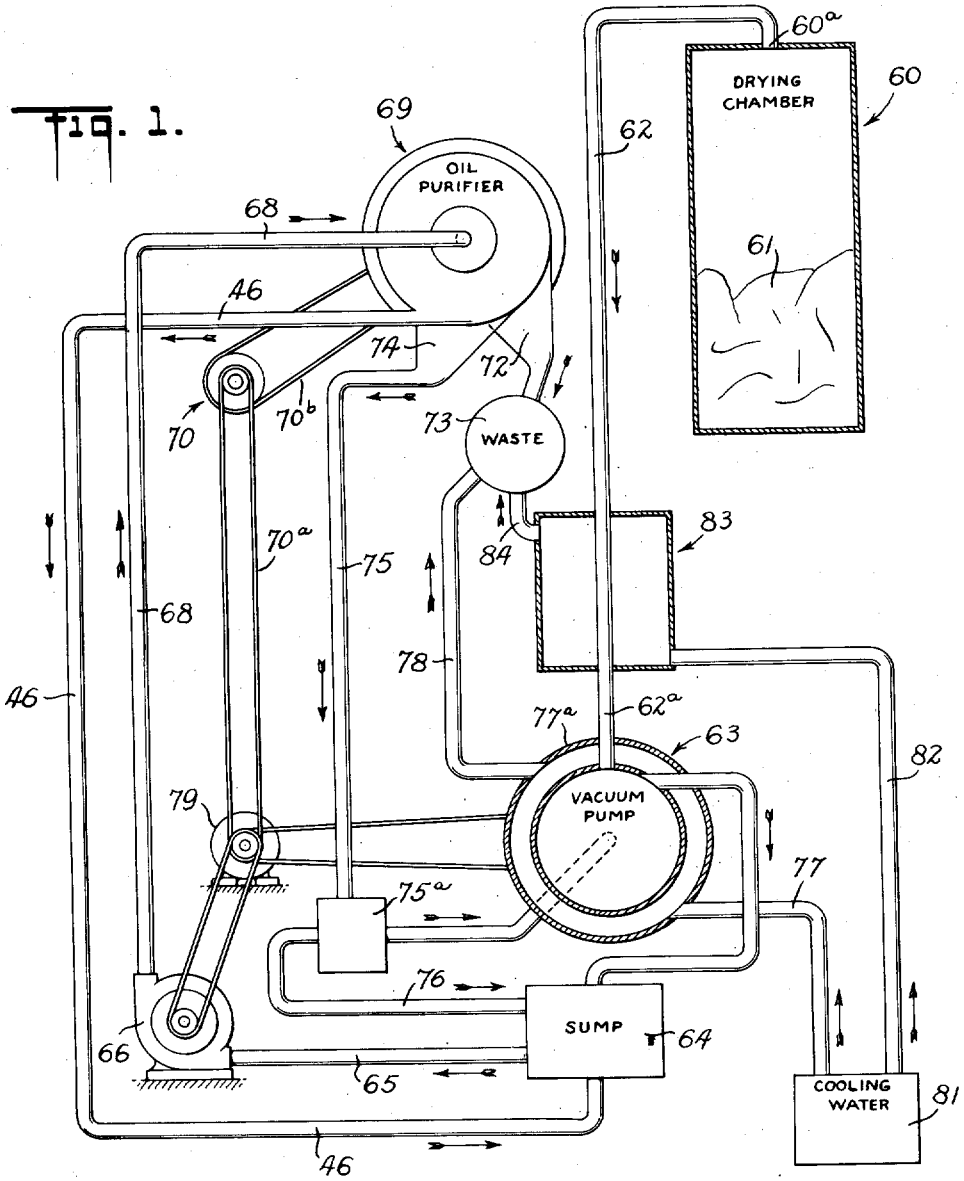
Figure 2:
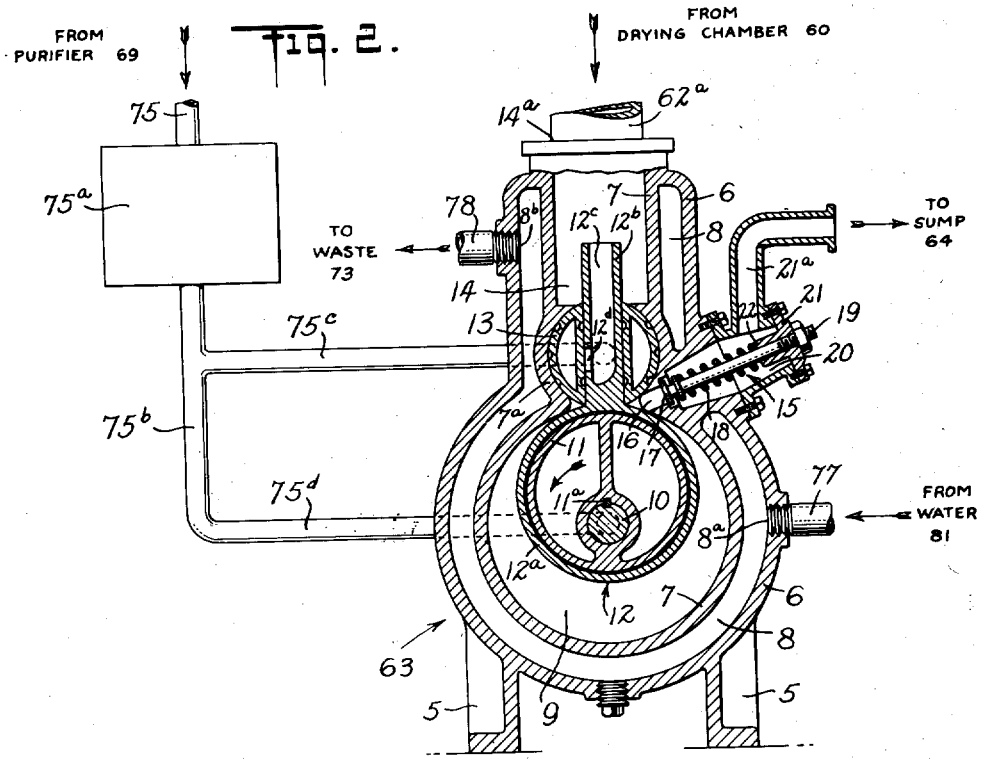
Figure 3:
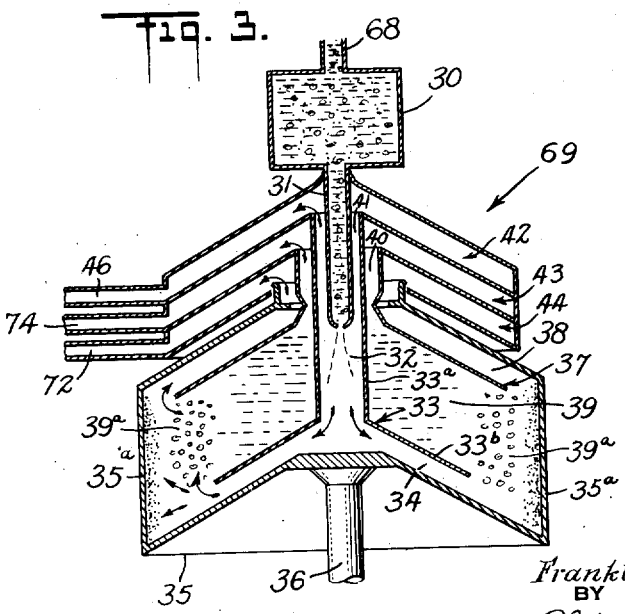

In the accompanying drawings in which is shown a preferred embodiment of the mechanical features of my invention, Figure 1 is a diagrammatic view of the several elements of my drying apparatus;

Figure 2 is a vertical section of the vacuum pump and oil reservoir shown in Figure 1; and Figure 3 is a diagrammatic vertical section of a part of the purifier shown in Figure 1.

Similar reference characters refer to similar parts throughout the several views of the drawings.

As conducive to a clearer understanding of certain features of this invention, it may first be noted that vacuum drying systems depend in part for efficient operation upon the lubricating and sealing properties of the oil used in the evacuating device in the system. Accordingly it is primarily important that such oil be kept in as pure and unadulterated condition as possible. Vacuum drying systems are notorious destroyers and wasters of oil mainly because the oil reconditioner incorporated therein is, in many instances, incapable of fulfilling its assigned duty. If these systems be made to utilize some type of settling tank wherein the adulterated oil runs through a filter to separate the foreign solid particles from the oil and water and permit the water to settle in the bottom of the tank, to be subsequently drained, the results are unsatisfactory. While some of the impurities would be separated in this manner, a large portion of them would still remain in the oil and be consequently reintroduced into the evacuator. As these impurities are constantly flowing into the evacuator with the oil, they are constantly being dispersed into the oil due to agitation by the evacuator. As the impurities consist of moisture and foreign particles, all the elements are present which upon working will cause emulsification of the oil and the moisture. Accordingly the evacuator functions also as a colloidal mill or homogenizer instead of functioning solely as a vacuum pump and the oil is impaired as a lubricating and sealing medium. As a settling tank or the like will not separate an emulsion, it would soon become necessary to drain off the emulsified oil and introduce new and pure oil. Inasmuch as a large quantity of oil is used, this constant changing would not only entail considerable expense and interrupted operation, but also inconvenience and a problem of waste disposal. Furthermore, the emulsifying action is considerably expedited due to the relatively high temperature of the impurities and moisture drawn into the evacuator from the drying chamber. The heat tends to reduce the viscosity of the oil thus rendering it less effective as a sealing medium and more amenable to emulsification. One of the dominant objects of this invention is to provide a method and apparatus for a vacuum drying system wherein the above-noted conditions as well as many others are practically and efficiently rectified.

With reference to Figure 1, there is generally indicated at 60 a drying chamber or the like which is preferably capable of maintaining a vacuum and in which may be deposited a mass of material 61 for drying. Chamber 60 is provided with an opening or port 60a which receives a pipe 62 which is suitably connected with a condenser generally indicated at 83 and extends therethrough to connect with a pipe 62a leading from the condenser. A pipe 82 communicates with the interior of condenser 83 and introduces cooling water therein from any convenient source 81 to surround pipe 62 and cool vapors passing therethrough. Another pipe 84 connects condenser 83 with a suitable waste drain 73 to provide an exhaust channel for the cooling water introduced into the condenser. Thus cool water completely surrounds and circulates about pipe 62 to reduce the temperature of moisture, gases, foreign particles and the like withdrawn from chamber 60.

Pipe 62a leads into a vacuum pump generally indicated at 63. Pump 63, the construction and operation of which will be more fully described hereinafter, withdraws moisture, gases and foreign particles from material 61 and deposits them into a sump 64 or the like. Large quantities of oil used in pump 63 for lubricating and sealing purposes are likewise forced into sump 64.

As the oil comes into direct contact with the moisture and foreign particles withdrawn from chamber 60 and as all are mixed together by the violent agitation of the moving parts of the pump, it is desirable to remove the mixture and separate it into its component parts as rapidly as possible in order to avoid emulsification of the oil and its consequent impairment as a lubricating and sealing medium. To this end preferably I provide a pipe 65 which connects sump 64 with a suitable pump 66 belt-driven by a motor 70. Pump 66 sucks the mixture from sump 64 through pipe 65 and forces it through a pipe 68 into a purifier or separator generally indicated at 69. Separator 69 is preferably of the centrifugal type and may also be belt-driven by motor 70, or by mechanical transmission from pump shaft 10 if desired.

Separator 69, to be more fully described hereinafter, separates the oil from the moisture and foreign particles in the mixture, shunts the impurities into a channel 72 which leads into drain 73, and diverts the purified oil into a channel 74 which connects with pump 63 by way of a pipe 75 and a reservoir 75a. Preferably an overflow pipe 76 connects channel 74 with sump 64 to provide a by-pass for surplus oil in excess of the quantity which reservoir 75a and pump 63 can accommodate. Preferably purifier 69 likewise has an overflow pipe 46 connected to sump 64 to accommodate excess mixture which would otherwise overtax the capacity of the purifier.

Preferably pump 63 is provided with a cooling jacket, illustratively shown as a jacket 77a, which connects at one end with a pipe 77 connected to water source 81 and at the other end with a pipe 78 connected to drain 73. Accordingly cooling water from source 81 flows through pipe 77, water jacket 77a, and pipe 78 to empty into waste drain 73. Thus the heat engendered in pump 63 by friction of moving parts, high pressures and the heat of the foreign particles and moisture is rapidly and efficiently dissipated, the purposes and advantages of which will be more fully indicated hereinafter.

It may now be seen that the construction is unitary in character and that the several elements, namely the drier, the condenser, the vacuum pump, the oil pump and the purifier, are so combined as to produce a highly meritorious result due to their coaction, all as will be more specifically pointed out hereinafter.

Referring now to Figure 2 of the drawings, vacuum pump 63 comprises a base 5 which supports an outer casing or water jacket 6 which, with an inner wall or casing 7, encloses a space 8 through which cooling water may circulate. Wall 7 also comprises a cylinder wall which encloses a cylinder space 9 in which a drive shaft 10 supports an eccentric or cam part 11. Shaft 10 may be suitably journaled in the ends (not shown) of the pump body and is driven in any convenient manner as for example by a belt connected to motor 70 (Figure 1).

Cam 11 (Figure 2) has slidably mounted thereabout a piston generally indicated at 12 having a cylindrical body portion 12a which is of such a size as to be in tangential contact with the inner surface of casing 7. A slide arm 12b is joined to portion 12a of piston 12 and reciprocates in a slide pin 13 rotatably mounted in a portion 7a of casing 7. Thus as drive shaft 10 revolves, as indicated by the arrow in Figure 2, cam 11 being driven thereby through a key 11a imparts a rotary motion to piston 12 tangentially about the inside of wall 7 of cylinder 9. Slide arm 12b reciprocates through slide pin 13 and also rocks back and forth causing pin 13 to rotate alternately in opposite directions.

Slide arm 12b has a bore 12c connecting with a port 12d formed in the slide arm. As arm 12b operates, it moves upwardly into a chamber 14 formed in pump 63 by the upper part of casing 7 and any substance flowing through pipe 62a (Figure 1), which communicates with chamber 14 by a port 14a (Figure 2), is admitted into cylinder 9 when arm 12b reaches the bottom of its travel permitting port 12d to communicate with the upper part of cylinder 9.

As piston 12 pursues its tangential travel around the inner surface of casing 7, a vacuum is created behind the piston which draws in air, moisture, and foreign particles from pipe 62a through hollow portion 12c and port 12d when port 12d passes the bottom of pin 13. Thus moisture, gases, and foreign particles are sucked out of chamber 60 (Figure 1) into pump 63 by way of pipe 62, condenser coil 83, pipe 62a, port 14a (Figure 2), chamber 14, hollow portion 12c and port 12d.

Just before piston 12 attains its highest position, port 12d in arm 12b is completely closed by pin 13, thus forming an efficient mechanically operated suction valve.

The moisture, gases, and foreign particles thus drawn into cylinder 9 are expelled through a spring-biased-discharge valve, generally indicated at 15. Valve 15 comprises a port 16 formed in casing 7 and communicating with cylinder 9, a valve seat 17, a guide rod 19, a valve spring 18 disposed about guide rod 19 and biasing seat 17 toward a closed position, and chamber 20 in which the guide rod and spring are disposed. A suitable housing or casing 21 receives the outer end of guide rod 19 and provides an abutment 22 against which spring 18 bears in forcing the valve seat toward its closed position. A suitable channel 21a communicates with chamber 20 and is connected to pipe 46 (Figure 1) leading to sump 64. The pressure created in cylinder 9 by the tangential movement of piston 12 therein forces valve block 17 from its seat against the action of spring 18 to permit discharge of moisture, gases, foreign particles, and oil from cylinder 9 through port 16, chamber 20, channel 21a, and pipe 46 (Figure 1) into sump 64.

In order to insure efficient operation of pump 63, cooling water is circulated through water jacket 8, the water being introduced through an inlet 8a connected with pipe 77 from source 81 and escaping through an outlet 8b connected with pipe 78 leading to waste drain 73. Reservoir 75a is preferably located between purifier 69 and pump 63. Pipe 75 (Figure 1) connects the reservoir to channel 74 leading from the purifier and a pipe 75b (Figure 2) forms an outlet from the reservoir.

Connected to pipe 75b I provide a pipe 75c and a pipe 75d. Pipe 75c connects with suitable ports (not shown) formed in both ends of pump 63 to provide oil lines for lubricating and sealing oil for pin 13 and hollow arm 12b. In a substantially similar manner, pipe 75d provides adequate oil for lubricating drive shaft 10 and cam 11 and for both lubricating and sealing the bearing surfaces of piston 12 and cylinder wall 7. In this manner an ample supply of oil is delivered to both ends of the pump and the risk of the pump running dry is obviated.

Thus it will be clear that I have provided a suitable pump capable of efficient operation even when subjected to repeated charges of slugs of moisture, uncondensed gases and foreign particles.

During the operation of the pump, the lubricating and sealing oil, used therein, comes into continuous contact and is mixed with the liquids, gases and foreign particles sucked out of the drying chamber. If no more than the oil and moisture were mixed together without any great amount of turbulence or working, the oil might be purified by allowing the moisture to settle out and be drained off in a settling tank. Even so, however, all the moisture could not be thus removed and the oil would rapidly lose its body and its sealing and lubricating properties would thus be lost. This would result in a decrease of vacuum pump efficiency as the pump has large areas continually in need of lubrication and sealing during the motion of the several moving parts. As the piston in the pump revolves at a high number of revolutions per minute, the oil and impurities are subjected to such great turbulence and working that the resultant mixture is a sludge which will not readily separate into its component parts by setting. It follows that a portion of this sludge will be returned to the pump and will be worked again.

When there is a third agent, such as particles of the material in the drying chamber, in the presence of oil and moisture, and the three are worked together, the particles act as an emulsifying agent in causing the oil and moisture to emulsify. Such working and consequent emulsification takes place when the several substances are forced repeatedly through small orifices or spaces such as between the piston and cylinder walls of the pump or any other contacting surfaces therein. It is, of course, impossible to settle out the oil in this event as the emulsion is stable and the oil is, therefore, useless for sealing or lubricating purposes.

In order to prevent the deterioration of the oil by emulsification, the oil should be separated from the impurities immediately after leaving the pump and before a sludge can be formed. In order to carry out such separation or purification, I provide the centrifugal purifier 69 (Figures 1 and 3).

A portion of purifier 69 is diagrammatically illustrated in Figure 3 wherein pipe 68, leading from pump 66 and sump 64 (Figure 1), empties into a reservoir 30 or the like suitably mounted in the top of the purifier. A pipe 31 connects with reservoir 30 and empties into a chamber 32 formed within a suitable separator bowl 35 rotatably mounted on a drive shaft 36. Shaft 36 may be driven through any suitable mechanism such as a countershaft and pulley, generally indicated at 70, by motor 79 and belts 70a and 70b (Figure 1).

Suitably disposed within bowl 35 (Figure 3) I preferably provide an element generally indicated at 33 comprising a substantially tubular portion 33a and a frusto-conical part 33b. Thus, when properly positioned in bowl 35, element 33 forms chamber 32 and with bottom of bowl 35 forms a passage 34.

Another element generally indicated at 37 is likewise disposed immovably within bowl 35 and is superimposed about portion 33a of element 33, thus forming a passage 38 with the top of bowl 35 and also a chamber 39 with the top of part 33b of element 33. Element 37 also forms a passage 40 with tubular portion 33a, and portion 33a forms still another passage 41 with pipe 31.

Thus it will be seen that there is provided four passages, namely, inlet passage 34 and the three outlet passages 38, 40, and 41, the purpose and operation of which will be described hereinafter.

Suitably arranged above bowl 35, I provide a series of chambers, preferably three in number and generally indicated at 42, 43 and 44. Chamber 42 connects passage 41 and thus to chamber 32; chamber 42 also connects pipe 46 which leads to sump 64 (Figure 1) to accommodate surplus sludge. Chamber 43 connects passage 40 and chamber 39 with pipe 74 which leads to oil reservoir 75a (Figure 1). Chamber 44 connects passage 38 with pipe 72 which leads to waste drain 73 (Figure 1).

In operation the adulterated oil is pumped from sump 64 by pump 66 into reservoir 30 from which it flows through pipe 31 into chamber 32, thence through passage 34 into the separator bowl chamber 39. As the separator bowl is revolving at a high rate of speed, any substances introduced therein will be subjected to the centrifugal force induced by the bowl's rotation. As the mixture in chamber 39 consists of several substances having different specific gravities, the heavier substances are forced toward the periphery of the bowl to the disadvantage of the lighter substances which are displaced from the outer portions of the bowl and hence forced toward the center thereof. Thus the foreign particles, being the heaviest components of the mixture, are forced against the outer wall 35a of bowl 35 where they form into a sticky mud and are removed from the mixture accordingly. The water in the moisture, having the next highest specific gravity is forced into portion 39a of chamber 39. The pure oil, having the lowest specific gravity of any of the components of the mixture, thus accumulates in the inner portion of chamber 39 in a substantially unadulterated condition.

As more mixture flows into the bowl, the water in portion 39a is displaced and flows through passage 38 into chamber 44 and from there to waste drain 73 by way of pipe 72. The pure oil in chamber 39 is likewise displaced and flows through passage 40 into chamber 43 from which it flows into reservoir 75a through pipe 74. If more mixture is introduced into the purifier than can be accommodated thereby, an overflow into sump 64 is provided by way of chamber 32, passage 41, chamber 42 and pipe 46.

As the mud forming on wall 35a would eventually clog passage 38 and generally impede the operation of the purifier, bowl 35 is so constructed that it can be readily removed for cleaning. In order to clean the bowl it is, of course, necessary to stop the purifier but, in order that the operation of vacuum pump 63 be uninterrupted, reservoir 75a is of sufficient capacity to store enough pure oil for the needs of the vacuum pump during the cleansing periods. Sump 64 is likewise of sufficient capacity to receive the mixture during such periods as pump 66 is shut down when the bowl is being cleaned. Thus it is not necessary to interrupt the operation of the drying system while the purifier is being cleaned.

While the many advantages of my vacuum drier are particularly well adapted to drying paper for example, such as is used in the manufacture of permittors, its advantages may be equally well utilized in other fields.

Accordingly it will be seen that I have provided a vacuum drying system wherein the lubricating and sealing oil is maintained in a pure and undiluted state with the result that the loss of oil through emulsification is reduced to a minimum, and wherein the several objects referred to hereinabove as well as many others are efficiently and successfully achieved.

As many possible embodiments may be made of the above invention, without departing from the scope of the invention, it is to be understood that all matter contained herein or shown in the several views of the drawings is to be interpreted as illustrative and not in a limiting sense.

What I claim is:

1. In combination, apparatus having a vacuous drying chamber for material characterized by a tendency to give off solids, moisture and gases during the drying process, an evacuating pump utilizing a sealing lubricant, means connected to said evacuating pump for supplying sealing lubricant to said pump, said evacuating pump being constructed so that the solids and liquids taken therein are mixed with and contaminate said lubricant, a sump, means for conveying said contaminated lubricant from said pump to said sump, separating means adapted to separate the lubricant from the solids and liquids, means for conveying said contaminated lubricant from said sump to said separating means, and means for returning purified lubricant from said separating means to said lubricant supplying means.

2. The combination with apparatus having a vacuous chamber from which solids, moisture and gases are drawn off during evacuation thereof, of a rotary vacuum pump utilizing a sealing lubricant, a reservoir connected to said pump for supplying sealing lubricant thereto, said pump being constructed so that the sealing lubricant runs through the interior thereof and mixes with the solids and liquids drawn therein to form a sludge, a sump, means for conveying sludge from said vacuum pump to said sump, a centrifugal separator for separating the lubricant from the solids and liquids, means including a circulating pump for conveying said sludge from said sump to said separator, common motor means for driving said vacuum pump, said circulating pump and said separator, and means for returning purified lubricant from said separator to said reservoir.

3. The combination with apparatus having a vacuous chamber from which solids, moisture and gases are drawn off during evacuation thereof, of evacuating means utilizing a sealing lubricant, a storage tank connected to said evacuating means for supplying sealing lubricant to said evacuating means, said evacuating means being constructed so that the solids and liquids taken therein are mixed with said lubricant to form a sludge, a sump, a conduit for conveying sludge from said evacuating means to said sump, separating means adapted to separate the lubricant from the solids and liquids, means for continuously conveying said sludge from said sump to said separating means, and means for continuously returning said lubricant from said separating means to said storage tank.

4. In combination, a vacuum pump, a sump containing sealing lubricant for said pump, a centrifugal separator for purifying said lubricant, means including a circulating pump for continuously conveying lubricant from said sump to said separator, means for continuously conveying purified lubricant from said separator to said pump, and means for continuously returning contaminated lubricant from said pump to said sump.

5. In combination, a vacuum pump, a reservoir containing a supply of pure sealing lubricant for said pump, a sump and pipe connections for conveying contaminated lubricant from the pump to said sump, a centrifugal separator for purifying the lubricant, means including a circulating pump and connections therefor for continuously supplying lubricant from said sump to said separator, and means including pipe connections for continuously returning pure oil to said reservoir.

6. A combination according to claim 5 wherein the centrifugal separator must be removed at times for the purpose of cleaning, and wherein said reservoir and said sump have sufficient capacity to supply adequate lubrication to said pump while said separator is being cleaned.

7. The combination with apparatus having a vacuous chamber from which a condensable vapor is drawn off during evacuation thereof, a pump for evacuating said chamber having a discharge port, a source of lubricant for lubricating and sealing said pump, means for continuously supplying lubricant from said source through the interior of said pump and discharging the same at the discharge port of said pump, said pump being operable to compress the vapor drawn from said chamber whereby a portion thereof is condensed and at least a part of the condensate is mixed with the lubricant and is discharged from said pump in the form of an emulsion, a sump, a conduit for conveying the emulsion and discharge gases from the discharge port of said pump to said sump, separating means adapted to separate the condensate from the lubricant, means for continuously conveying the emulsion from said sump to said separating means, and means for returning the condensate-free lubricant from said separating means to said source of lubricant.

8. The combination with apparatus having a vacuous chamber from which water vapor is drawn off during evacuation thereof, a pump for evacuating said chamber having a discharge port, a source of oil for lubricating and sealing said pump, means for continuously supplying lubricating oil from said source through the interior of said pump and discharging the same at the discharge port of said pump, said pump being operable to compress the vapor drawn from said chamber whereby a portion thereof is condensed and a part of the condensate is mixed with the oil discharged from said pump to form an emulsion, a sump, a conduit for conveying the emulsion and gases from the discharge port of said pump to said sump, a centrifugal separator, means for continuously conveying the oil emulsion from said sump to said centrifugal separator, and means for returning the condensate-free oil from said separator to said oil source.

FRANKLIN S. SMITH.